March 3, 1970  J. B. O'MARA  3,499,100
ELECTRIC CABLE CONNECTORS
Filed Oct. 3, 1968
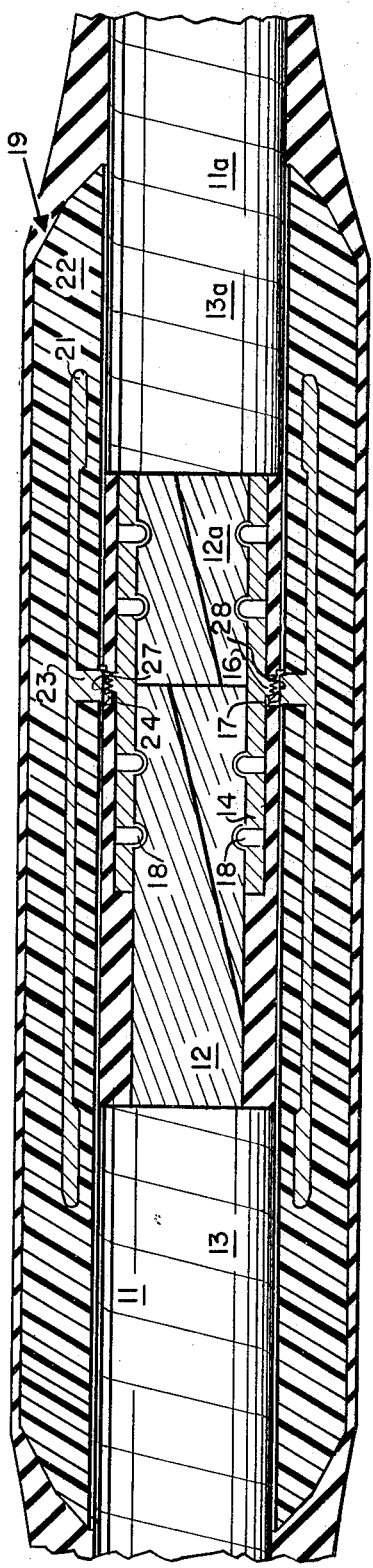
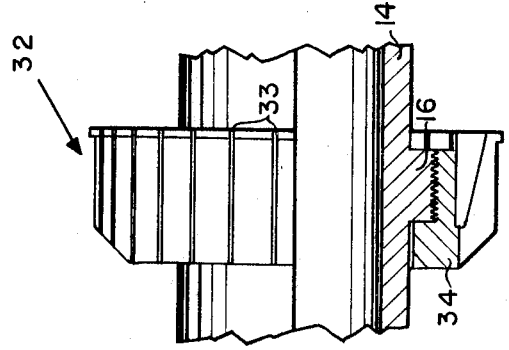
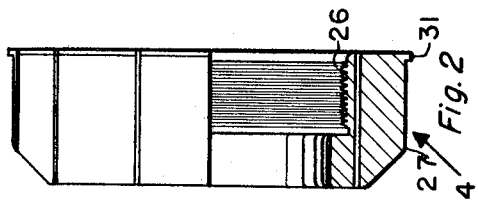
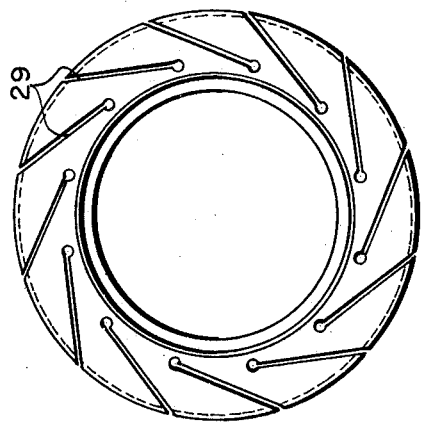
INVENTOR.
J. B. O'MARA
BY
V. F. Volk
HIS AGENT United States Patent Office 3,499,100
Patented Mar. 3, 1970

3,499,100
ELECTRIC CABLE CONNECTORS
Joseph B. O'Mara, Hastings-on-Hudson, N.Y., assignor to Anaconda Wire and Cable Company, a corporation of Delaware
Filed Oct. 3, 1968, Ser. No. 764,681
Int. Cl. H02g 3/06
U.S. Cl. 174—73                                  3 Claims

ABSTRACT OF THE DISCLOSURE

In high-voltage cable connections of the type where the conductor splice is shielded by means of a conducting cylinder embedded in a dielectric the shield is connected to the splice sleeve by means of a bridging member that threads onto the sleeve and has a wiping fit to the shield.

BACKGROUND OF THE INVENTION

My invention pertains to an improvement of connections in high-voltage cables of the types described in Patents 2,967,899 and 3,051,770 characterized by having a shield, embedded in a dielectric polymeric material, to form a shield assembly surrounding the conductor splice and extending over the ends of the cut cable insulation. The shield is electrically connected to the cable conductors and accomplishes the purpose of covering with a void-free, factory-built, adhesive dielectric those portions of metal at conductor voltage that are subjected to the greatest electric stress concentration. The principal deficiency in known forms of such connectors is associated with the means of connecting the shield to the conductors or to the conductor splice sleeve. This connection is made by means of an internal flange of the shield that projects through the surrounding dielectric at the splice. To understand why this should present a problem it must be understood, firstly, that it is desired to have the inside diameter of the encapsulated shield fit as closely as possible over the cable insulation, and secondly that in making a splice the shield assembly must be slid back over the insulation of one of the cables and then brought forward again over the conductor splice. Any large inward projection from the shield would either prevent sliding the assembly over a cable or require the embedded shield to be so much oversize that there would be too large a gap over the splice free from solid insulation. If, on the other hand, it is attempted to overcome this difficulty by extending the splice sleeve outward to meet the shield, the extension of the sleeve interferes with the operation of the hydraulic compression tool that is required to press the sleeve onto the conductor.

It has been suggested to thread the shield assembly onto the sleeve by rotating it around the splice. This procedure is subject to the objection that the shield assembly is rather large and clumsy to handle, particularly in confined quarters such as a manhole, and the threaded areas cannot be seen. The fact that the center of the splice is lost to sight when it is covered by the shield assembly also makes it desirable to have some positive positional stop when the assembly is returned over the splice, and this desideratum has not been met by some commercially available connectors.

SUMMARY

I have overcome the deficiencies of known connectors of the type described by means of the connector of my invention.

My invention has the object of providing a connector wherein the shield assembly fits very closely over the cable insulation and does not require to be rotated into position.

My invention has the object of providing a connector having reduced splice length.

My invention has the object of providing a connector adapted to compression sleeves that are applied with a hydraulic press.

My invention has the further object, in combination with those objects already mentioned, of providing a positive stop to position the shield assembly.

Further objects will become apparent from a consideration of the description hereinbelow given.

In a connector for joining high-voltage electric cables that comprise a metal sleeve that is compressed onto the cable conductors and a cylindrical metal shield concentric with the conductors embedded in a dielectric cylinder that fits around the cables at the joint, with the sleeve being mechanically and electrically connected to the shield, my improvement comprises a narrow, central, radial projection, integral with the sleeve, that has an outer circumferential surface. A resilient cylindrical metal bridging member is fitted around this surface and it comprises an outer wiping contact surface and an outwardly projecting shoulder that terminates the wiping contact surface. There are means such as a thread on the circumferential surface of the projection and a matching threaded area on the bridging member for locking the bridging member to the projections in good electrical contact. A metal flange projects inwardly from the shield. This flange has an internal surface of revolution that makes a compression fit against the contact surface of the bridging member. The diameter of this surface of revolution is smaller than the diameter of the shoulder so that it is stopped thereby. I prefer that the bridging member comprise a tubular wall with a plurality of slots extending inwardly from its outside surface. The slots divide the wall into a plurality of strips that are resilient under the pressure of the flange so as to make a wiping contact with the inner surface of revolution.

BRIEF DESCRIPTION OF THE DRAWING

FIGURE 1 shows a longitudinal section of a connection made to my invention.

FIGURE 2 shows an enlarged side view, partly in section, of an embodiment of the bridging member of my connector.

FIGURE 3 shows an end view of the member of FIGURE 2.

FIGURE 4 shows an enlarged side view, partly in section, of another embodiment of the bridging member of my connector.

DESCRIPTION OF THE PREFERRED EMBODIMENT

Referring to FIGURE 1 a cable 11 having a conductor 12 and insulation 13 is shown connected to a similar cable 11a having conductor 12a and insulation 13a. The insulation has been cut away in the usual manner to expose the conductors with a longer length of the conductor 12 exposed for the purpose of accommodating a compression sleeve 14 while the conductors are being butted. The sleeve 14 has a central radial projection 16 with an outside threaded surface 17. The projection 16 is shallow and may in fact comprise no more than raised threads on the surface of the sleeve 14 so that it does not interfere with the operation of a conventional hydraulic press that is used to make indents 18 in the sleeve 14 to bond it mechanically and electrically to the two conductors 12, 12a. The cable covering has been stripped off to expose a length of the insulation 13 great enough to slide a shield-epoxy assembly 19 out of the way over the cable 11 while the conductors are being spliced. This assembly 19 comprises a cylindrical metal shield 21 that is embedded in a polymeric dielectric 22. The assembly 19 has an inside diameter that fits very closely over the cable insulation 13, 13a, the clearance being determined by the length of a flange 23 that projects inwardly through the wall of the dielectric 22 for the purpose of making electrical and heat conductive contact with the sleeve 14. It will be realized that it is much desired to keep the connection between the cables as short as possible to conserve manhole space and for this reason the sleeve 14 should be kept short and the projection 16 narrow, bearing in mind that an increase in the length of the sleeve also requires an increase in the length of the insulation 13 that must be cut away. The shield 21 must extend beyond the cut ends of the insulation and if this is longer, the length of the assembly 19 will be correspondingly increased. To make an electrical and heat conducting contact between the projection 16 and the flange 23 a bridging member 24 is threaded over the projection 16 by means of internal threads 26 (FIGURES 2 and 4). During the step of compressing the sleeve 14 the bridging member is pushed back over the conductor 12 but after the sleeve is in place it is pulled forward and turned manually over the threads 17. This is necessary because it would not be possible to apply the press to the sleeve while the bridging member 24 was in position unless, of course, the sleeve 14 was much longer, which, as has been explained, is undesirable. An outside surface 27 of the bridging member 24 is adapted to make a wiping fit with an inside surface 28 of the flange 23. For this purpose biased slots 29 are cut non-radially from the surface 27 and the diameter of the bridging member is made somewhat larger than the internal diameter of the flange 23. A shoulder 31 serves as a stop for the flange 23 when the assembly 19 is moved into position over the splice. An alternative embodiment 32 of my bridging member is shown in FIGURE 4 having radial slots 33 in an annular U-section 34.

I have invented a new and useful article of which the foregoing description has been exemplary rather than definitive and for which I desire an award of Letters Patent as defined in the following claims.

I claim:
1. In a connector for joining high-voltage electric cables comprising a metal sleeve compressible onto the conductors of said cables and a cylindrical metal shield concentric with said conductors, said shield being embedded in a dielectric cylinder fitting around said cables and said sleeve being mechanically and electrically connected to said shield, the improvement comprising:
 (A) a central radial projection integral with said sleeve, said projection comprising an outer circumferential surface,
 (B) a resilient cylindrical metal bridging member fitted around said surface, said bridging member comprising an outer wiping contact surface and an outwardly projecting shoulder terminating said wiping contact surface,
 (C) means locking said bridging member to said projection in good electrical contact therewith,
 (D) a metal flange projecting inwardly from said shield through said dielectric comprising an internal surface making a compression fit against said contact surface, the diameter of said internal surface being smaller than the diameter of said shoulder so as to be stopped thereby.

2. The improvement of claim 1 wherein said locking means comprises threads on said outer circumferential surface of said projection and a matching threaded area on said bridging member.

3. The improvement of claim 1 wherein said bridging member comprises a tubular wall, a plurality of slots extending inwardly from the outside surface of said wall and dividing said wall into a plurality of strips resilient under the pressure of said flange.

References Cited

UNITED STATES PATENTS

| | | | |
|---|---|---|---|
| 2,336,040 | 12/1943 | Scott et al. | 174—22 |
| 2,967,899 | 1/1961 | Priaroggia | 174—73 X |
| 3,051,770 | 8/1962 | Palmieri | 174—73 X |

LARAMIE E. ASKIN, Primary Examiner

U.S. Cl. X.R.

174—22